(12) United States Patent
Risi et al.

(10) Patent No.: US 6,901,464 B2
(45) Date of Patent: May 31, 2005

(54) PUCK INTERFACE ADAPTER INCLUDING DRIVERS FOR INTERFACING SERIAL DEVICE TO HOST WHEREIN PUCK IMPLEMENTS COMMAND MODE AND PASS THROUGH MODE

(75) Inventors: Michael Risi, Aptos, CA (US); Thomas C. O'Reilly, Santa Cruz, CA (US); Duane Edgington, Pacific Grove, CA (US)

(73) Assignee: Monterey Bay Aquarium Research Institute, Moss Landing, CA (US)

( * ) Notice: Subject to any disclaimer, the term of this patent is extended or adjusted under 35 U.S.C. 154(b) by 81 days.

(21) Appl. No.: 10/407,951

(22) Filed: Apr. 4, 2003

(65) Prior Publication Data

US 2004/0015618 A1 Jan. 22, 2004

Related U.S. Application Data

(60) Provisional application No. 60/370,741, filed on Apr. 5, 2002.

(51) Int. Cl.$^7$ ............................ G06F 3/00; G06F 13/00
(52) U.S. Cl. .................................. 710/62; 710/8; 710/9; 710/10; 710/11; 710/14; 710/16; 710/63; 710/64; 710/72; 709/227; 709/250
(58) Field of Search .................................. 710/8–11, 14, 710/16, 62, 64, 72; 709/227, 250

(56) References Cited

U.S. PATENT DOCUMENTS

| | | | |
|---|---|---|---|
| 4,695,955 A | | 9/1987 | Faisandier .................... 364/413 |
| 5,815,682 A | * | 9/1998 | Williams et al. ............... 703/25 |
| 5,821,405 A | | 10/1998 | Dickey et al. ............. 73/53.01 |
| 6,131,125 A | * | 10/2000 | Rostoker et al. ............ 709/250 |
| 6,633,927 B1 | * | 10/2003 | Jackson et al. ............... 710/33 |
| 6,753,881 B1 | * | 6/2004 | Callway et al. ............. 345/699 |
| 2004/0230710 A1 | * | 11/2004 | Goodman ..................... 710/8 |

OTHER PUBLICATIONS

Xport Product Brief, LANTRONIX®, pp. 1–2, retrieved on Jul. 29, 2003. Retrieved from the internet: <URL: http://www.lantronix.com/products/eds/xport/index.html>.
Xport Data Sheet, LANTRONIX®, pp. 1–5, retrieved on Jul. 29, 2003. Retrieved from the internet: <URL: http://www.lantronix.com/products/eds/xport/index.html>.
Xport Block Diagram, LANTRONIX>, 1 page, retrieved on Jul. 29, 2003. Retrieved from the internet: <URL: http://www.lantronix.com/products/eds/xport/SportBlockdiag.jpg>.

* cited by examiner

*Primary Examiner*—Tammara Peyton
(74) *Attorney, Agent, or Firm*—Lumen Intellectual Property Services, Inc.

(57) ABSTRACT

The invention provides a plug-and-work sensor interface device named "puck" for fast and easy deployment of various types of serial devices, which include commercial off-the-shelf and custom-made sensors and instruments, in a distributed, dynamic oceanic observing network. In an embodiment, each puck is removably attached and electrically coupled to a specific sensor to be deployed. The puck comprises a non-volatile memory for associating and storing arbitrary binary information about the sensor and a microprocessor for controlling how the information is read from and written into the non-volatile memory. The sensor information may include unique sensor identifier, sensor metadata, sensor device driver, etc. The puck itself does not execute any of the device code; rather, a host retrieves the sensor information from the puck when the puck is plugged in. The retrieval can be done automatically or semi-automatically with user interaction. After introducing the sensor to the host, the puck retires into a pass mode, allowing the host to communicate directly with the sensor. According to an aspect of the invention, the deployment of any serial device essentially consists of the steps of removably attaching a puck to the serial device and plugging the puck into a host.

20 Claims, 10 Drawing Sheets

Puck Host Side Class Diagram

PUCK INTERFACE ADAPTER INCLUDING DRIVERS FOR INTERFACING SERIAL DEVICE TO HOST WHEREIN PUCK IMPLEMENTS COMMAND MODE AND PASS THROUGH MODE

CROSS-REFERENCE TO RELATED APPLICATIONS

This application claims priority to a provisional patent application No. 60/370,741, filed Apr. 5, 2002, which is hereby incorporated by reference in its entirety.

FIELD OF THE INVENTION

This invention generally relates to interface devices. More particularly, it relates to an interface device, system, and architecture for fast and simple plug-and-work instrument deployment in a distributed, dynamic network environment.

DESCRIPTION OF THE BACKGROUND ART

A distributed dynamic sensor network such as an ocean sensor network typically comprises at least one host connected to a plurality of monitoring devices. These monitoring devices, which may comprise commercial off-the-shelf sensors as well as custom-made or one-of a-kind instruments, often operate on very diverse software protocols, including serial communication protocols such as RS-232 and RS-485. As such, to deploy a sensor in the network requires complicated, manual, time-consuming, tedious, and error-prone device software installation and platform configuration.

For example, the MBARI (Monterey Bay Aquarium Research Institute) Ocean Observing Systems (MOOS) provide capabilities to instrument locations of scientific interest in various geographical sites. The capabilities include cable laying and connection, satellite based bi-directional communications, instrumentation interface, data management, event detection and response, as well as integration, interfacing, and operation with other platforms including autonomous underwater vehicles (AUV's) and vertical profilers. Accordingly, as shown in FIG. 1, a MOOS network 100 may include various instruments and sensors such as fluorometers, radiometers, spectroradiometers, seismic sensors, Acoustic Doppler Current Profilers (ADCP's), and Conductivity-Temperature-Depth (CTD) instruments. A computer with an ADCP graphic user interface (GUI) hosts a plurality of servers/drivers for the various instruments and sensors coupled thereto. The computer may be located onboard a ship allowing a user on the ship to monitor the instruments and sensors as well as using the database and services at shore.

Currently, there are more than one hundred MOOS candidates, including commercial off-the-shelf sensors as well as custom-made, one-of a-kind instruments. These MOOS candidates come with diverse software protocols. As such, to deploy a monitoring device in the MOOS network 100, one must first configure the device by plugging the device into a host port, installing onto the host the device software and configuration files, etc., and modifying the host's configuration file, e.g., port number, baud rate, etc. As a result, the deploying process is often time consuming, tedious, and prone to errors.

U.S. Pat. No. 4,695,955, issued to Faisandier of Paris, France, discloses an electronic device that provides a universal interface between sensors and an acquisition and processing system of the signals originating from the sensors. In Faisandier, various sensors are connected to standardized terminals, appearing all identical to the user. Developed for medical applications, Faisandier's universal interface is limited to the generation of a signal reflecting correctly the activity of the sensor. Faisandier's patent does not address or solve the aforementioned problems related to deploying sensing instruments in a distributed, dynamic network.

In the case of an ocean sensor network, the presence of water, e.g., immersion of hardware in saltwater, adds to the difficulty of sensor deployment. U.S. Pat. No. 5,821,405, issued to Dickey et al. of Texas, USA, discloses a modular water quality measurement apparatus and method. The modularized sensor system comprises a sealed or unsealed housing to which is attached a universal sensor interface cap having mechanical sensor connections thereon for receiving removably attachable sensors. The removably attachable uniform sensors are conformed so as to fit within and to seal the mechanical sensor connections. Dickey et al.'s invention essentially solves the aforementioned problems related to diverse sensor software protocols and platform configuration by providing a specially designed uniform sensor apparatus.

Currently, there are no viable plug-and-work solutions to deploying sensing/monitoring instruments of various types and software protocols in a distributed, dynamic sensor network, particularly in an oceanic environment.

SUMMARY

The present invention addresses the challenging requirements of deploying monitoring instruments in a distributed, dynamic network, such as an ocean sensor network, with an innovative plug-and-work architecture. The plug-and-work architecture includes an easily removable/attachable sensor interface device, hereinafter referred to as "puck", that enables fast and simple plug-and-work sensor deployment.

The puck utilizes relatively simple software and provides low-level hardware solutions to the plug-and-work requirements. According to an embodiment of the present invention, a puck can be potentially very small and could fit inside of an instrument connector or cable. Each puck associates data with a specific sensor closely coupled thereto. In an embodiment of the present invention, a puck comprises a persistent storage for storing sensor information and a microprocessor for controlling writing and reading the sensor information to and from the persistent storage. According to an aspect of the present invention, the sensor information, e.g., unique sensor ID, sensor metadata, sensor "driver" code, etc., is packed into, i.e., written to, the sensor's puck during sensor configuration.

According to the principles of the present invention, when the puck is plugged into a host computer for the sensor's deployment, the host computer automatically retrieves the sensor information from the puck. The host can then utilize that information where appropriate. For example, the host may retrieve the sensor "driver" code from the puck and execute that code. According to an aspect of the present invention, the host computer communicates with the puck via a communication port such as a serial port and invokes simple ASCII commands such as READ, WRITE, and PASS. The READ command returns a packet of data from the puck. The WRITE command writes a packet of data to the puck. The PASS command puts the puck into a pass-through mode. The host computer comprises a cross-platform port monitor software capable of continuously monitoring the host computer's communication ports, detecting and responding to any "plug-in" events on the ports, retrieving and extracting sensor information from the puck, and starting sensor software based on the extracted sensor information.

DETAILED DESCRIPTION

Figure 1:
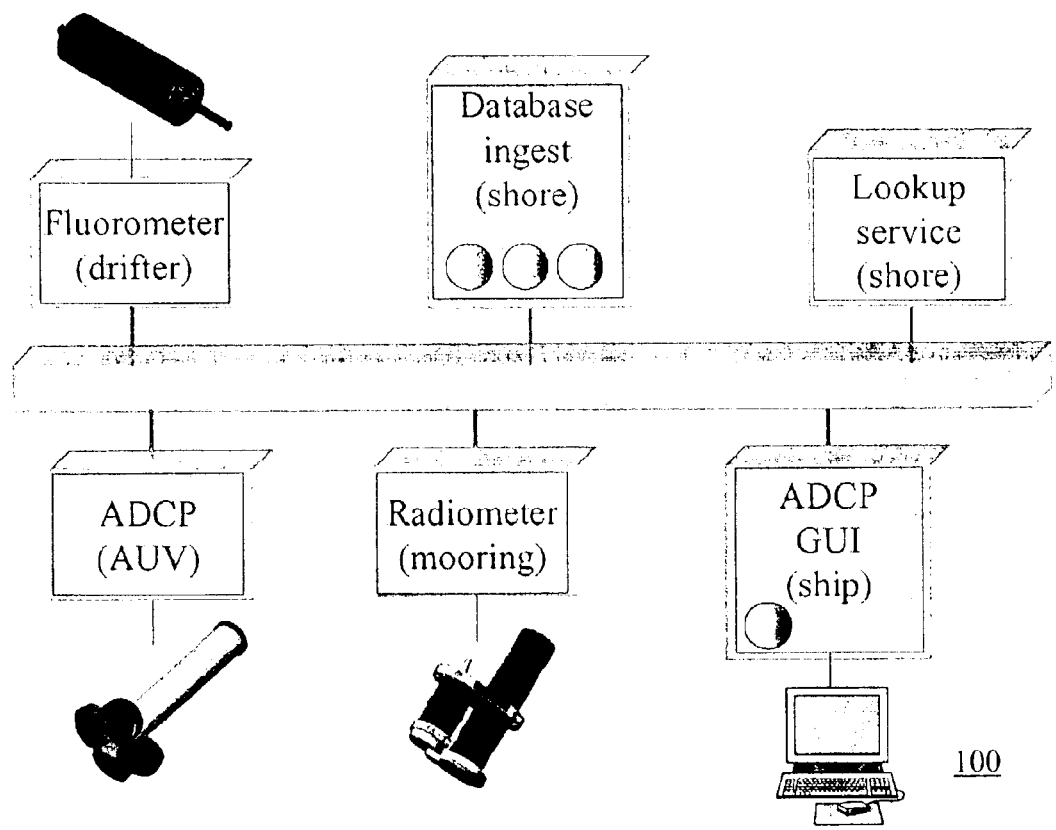
FIG. 1 shows a schematic of an ocean observing network where the present invention may be implemented.
Figure 2:
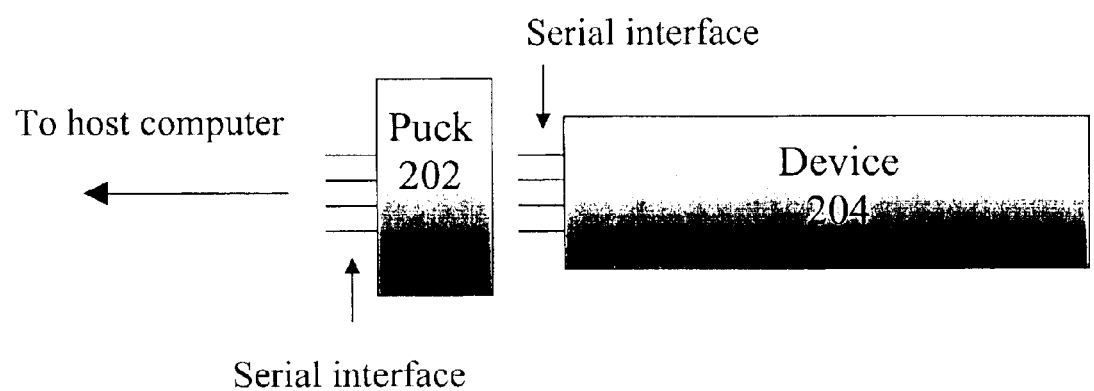
FIG. 2 illustrates a puck concept according to an aspect of the invention.

The plug-and-work architecture has three main requirements. First, the host must be able to retrieve, automatically or in response to a user command, information from a serial interface at a time when the interface is plugged-in. Second, a persistent storage or non-volatile memory is needed on or very near the interface. Third, a serial protocol is needed for writing and reading information to and from the persistent storage. FIG. 2 illustrates a puck concept that conforms to the plug-and-work requirements. As shown in FIG. 2, a puck 202 associates data with a specific serial device 204 removably closely coupled thereto. The puck 202 always travels with the serial device 204. The puck 202 can be customized for virtually any serial device. In FIG. 2, the serial device 204 is a sensor, but it could also be an instrument equipped with more than one sensor. The serial device 204 may be a monitoring instrument used in open sea, space, underground, or on land. Examples of possible serial devices include fluorometers, radiometers, spectroradiometers, Acoustic Doppler Current Profilers (ADCP's), Conductivity-Temperature-Depth (CTD) instruments, and the like.

The puck 202 contains information about the serial device 204. The information can be any information about the serial device 204, including, but not limited to, device driver, unique device identifier, calibration data, and instrument history. The information can be in a form of binary data or other types of data format. The host retrieves device information from the puck 202 when the puck 202 is plugged in.

This puck concept realizes a plug-and-work solution to the aforementioned problems related to deploying monitoring instruments in a distributed, dynamic network. The deployment process is essentially reduced to two main steps: a) physically plugging a puck, which is removably attached to a serial device to be deployed, to a host port; and b) the puck and the host cooperate to configuring the serial device, i.e., installing device software and calibration files, modifying platform configuration, and running necessary software to monitor the serial device, and so on. The configuring step can be performed automatically upon the host port detecting a plug-in event. However, for underwater deployment, the configuring step is preferably user interactive, i.e., physically plugging-in the puck first and then wait for a user command to start retrieving information from the puck.

In this plug-and-work architecture, the puck performs three important roles: it provides a standardized connection between the serial device and the host; it introduces the serial device to the host; and, after the introduction, it acts as a relay between the two.

Figure 3:
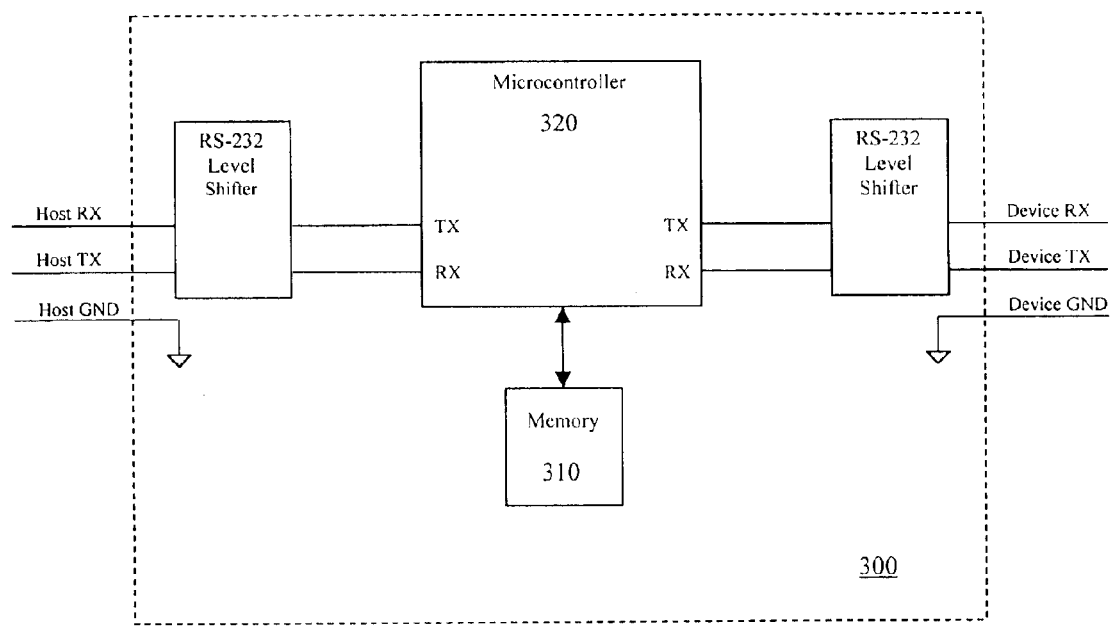
FIG. 3 schematically shows the top-level diagram of a puck according to an embodiment of the invention.

FIG. 3 is a top-level schematic of a puck 300 according to an embodiment of the present invention. The puck 300, which functions similar to the puck in FIG. 2, is removably attached to a serial device such as a sensor (not shown). The puck 300 comprises a memory 310, e.g., a persistent storage, for storing sensor information and a microprocessor or microcontroller 320 for controlling writing and reading the sensor information to and from the memory 310. According to an aspect of the present invention, the sensor information, e.g., unique sensor ID, sensor metadata, sensor "driver" code, etc., is packed into, i.e., written to, the sensor's puck during sensor configuration. The sensor, or any serial device closely coupled with a corresponding puck, can be configured using software provided by the vendor or manufacturer. Alternatively, the serial device can be configured by assigning a unique DeviceID, specifying codes and files to be packed into the puck, and writing files to the puck.

When the sensor is ready for deployment, the puck is plugged into a host computer (not shown). The host computer retrieves the sensor information from the memory 310. The host computer can then utilize that information where appropriate. For example, the host computer may retrieve the sensor "driver" code from the puck 300 and execute that code. In this embodiment, the host computer communicates with the microcontroller 320 via the RS-232 serial port and invokes simple ASCII commands such as READ, WRITE, and PASS. The READ command returns a packet of data from the puck 300. The WRITE command writes a packet of data to the puck 300. The PASS command puts the puck 300 into a pass-through mode. Exemplary puck commands are listed in Table 1 below.

TABLE 1

| Command | Purpose |
| --- | --- |
| READ | Read data from puck's memory |
| WRITE | Write data to puck's memory |
| FLUSH | Force puck to write any data in its write buffer to memory |
| ERASE PUCK | Erase all of the puck's memory |
| PUCK OUT | Switch puck into pass-through mode |
| PUCK IN | Switch puck into command mode |
| SET H [entry number][64 bytes entry data] | Set one of the puck's four [0–3]64 byte header entries |
| GET H[entry number] | Return one of the puck's four [0–3]64 byte header entries |
| SET RP [location] | Set the position in memory from where the puck will READ data |
| GET RP | Get the position in memory from where the puck will READ data |
| SET WP [location] | Set the position in memory to where the puck will WRITE data |
| GET WP | Get the position in memory to where the puck will WRITE data |

Figure 4:
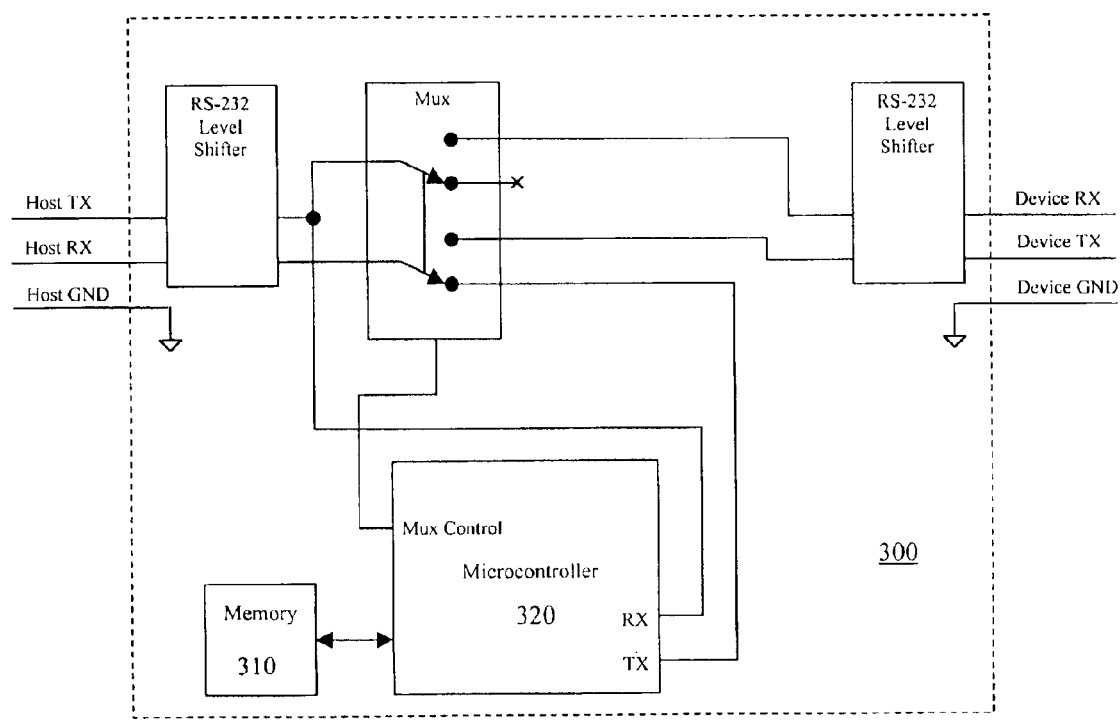
FIG. 4 schematically shows the puck of FIG. 3 in command mode.
Figure 5:
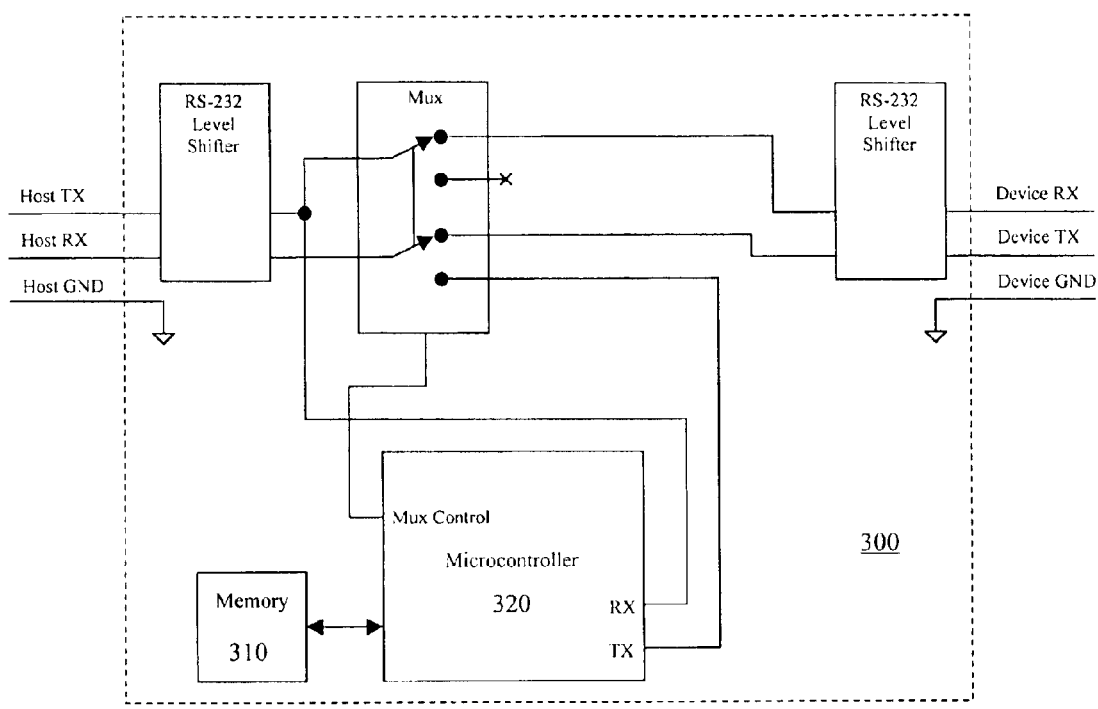
FIG. 5 schematically shows the puck of FIG. 3 in pass-through mode.

FIGS. 4 and 5 respectively illustrates the puck 300 in puck (command) mode and device (pass-through) mode. As is apparent to one skilled in the art, the RS-232 level shifter shown in FIGS. 3, 4, and 5 can be any serial communication interface means, e.g., interface means that conform to the RS-485 protocol. Similarly, any suitable switching means can be implemented in place of the multiplexer for changing modes of the puck. The microprocessor 320 can be a low-end microcontroller, e.g., RabbitCore™, which is quite inexpensive. Again, the microprocessor 320 controls access to the non-volatile memory 320, does not care what is stored in the non-volatile memory 320, and does not perform sophisticated processing such as executing the sensor information stored in the non-volatile memory 320. The simplicity of the puck design allows a puck to fit inside of an instrument connector or cable while performing those important roles mentioned above. The pucks according to the present invention can thus be very small, inexpensive, and efficient.

Figure 6:
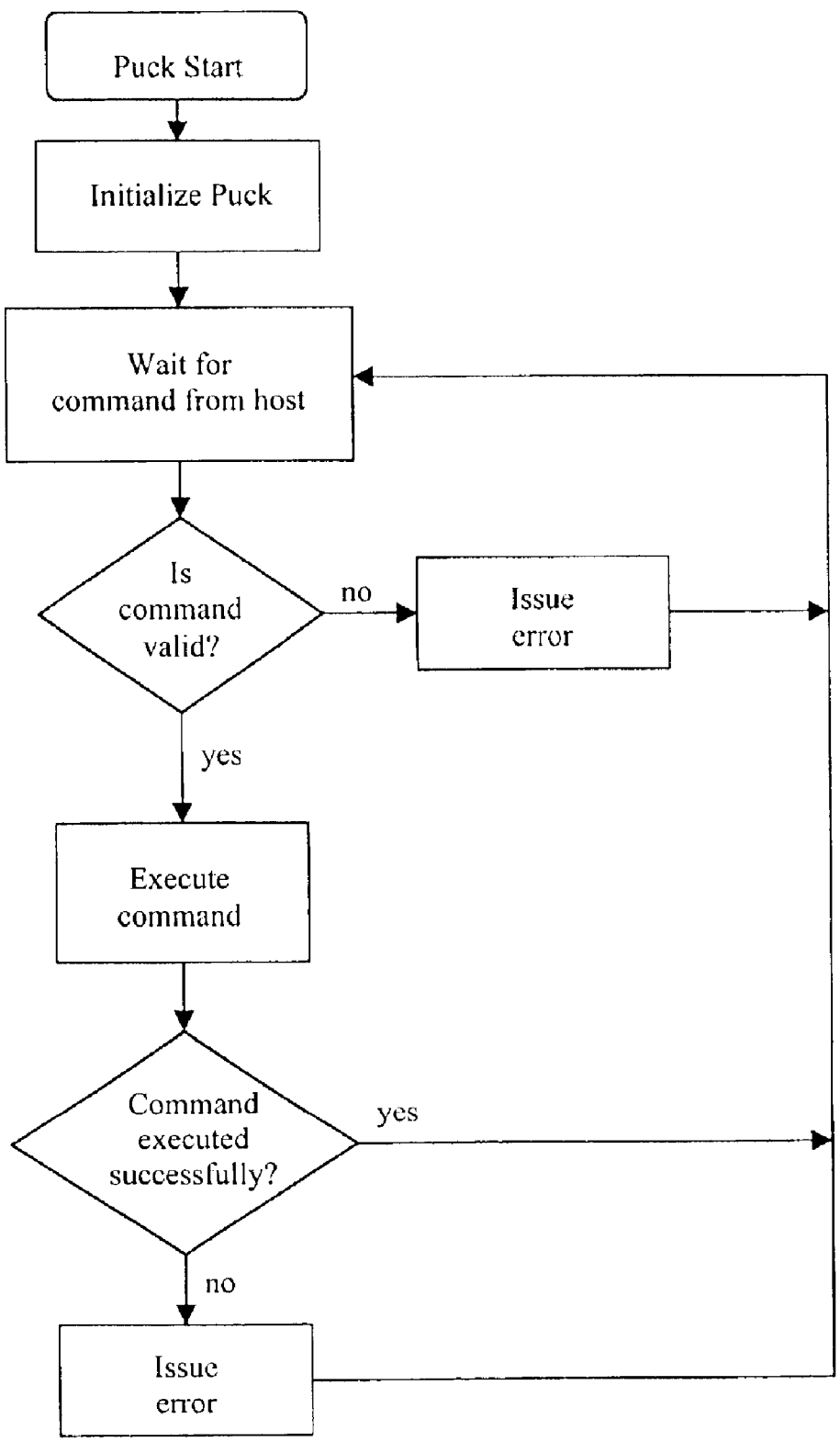
FIG. 6 is a flowchart illustrating a puck protocol according to an aspect of the invention.

In addition to controlling the puck's modes via the serial communication interface means, these simple ASCII puck commands allow the host computer to communicate with the puck's microcontroller 320 to access puck's memory 310 and obtain information stored therein, e.g., a java archive (JAR) file containing a device driver and any type of binary data such as calibration data and instrument history. FIG. 6 is a flowchart illustrating the puck's simple serial protocol.

Figure 7:
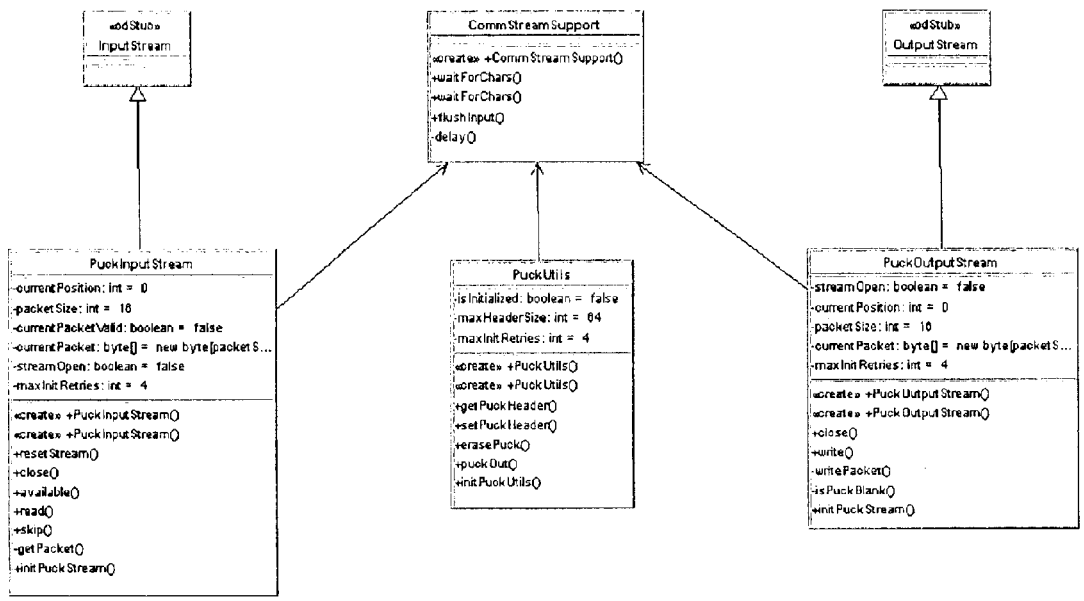
FIG. 7 is a puck host side class diagram for a puck API.

Preferably, the entire instrument driver is archived into a single JAR file. JAR files support compression while preserving directory structure. In addition, a JAR file contains a manifest describing contents and is easy to use with java application programming interface (API) executing on a host computer. The puck API is illustrated in FIG. 7. In short, PuckInputStream is a java class that allows the binary data to be extracted from the puck; PuckOutputStream is a java class used to write binary data to the puck's memory; and PuckUtils is a class containing other puck manipulation methods.

Using the puck API, utility applications can be created to configure a puck from a host computer. For example, put_it is a java application that writes binary data to the puck's memory; get_it is a java application that reads binary data from the puck's memory; and chk_it determines if the puck is programmed and how much memory is used.

In some embodiments, the host computer includes cross-platform "port monitor" software for continuously monitoring the host computer's communication ports, detecting and responding to any "plug-in" events on the ports, retrieving and extracting sensor information from the puck, and starting sensor software based on the extracted sensor information. In an embodiment, an event listener such as a java serial port event listener is used to listen for a specific event to detect plug in. Exemplary events include break interrupt, data set ready, and ring indicator.

The host port monitor program can be very generic since it does not need a priori knowledge of which sensing instrument is plugged into which port. That is, there is no need to pre-install the sensing instrument's device driver, as the port monitor retrieves the driver from the puck at plug-in time. According to the plug-and-work architecture of the present invention, through the puck, the host computer can configure and communicate with the sensing instrument on-the-fly, i.e., at the time of deploying the sensing instrument. The same generic port monitor software can thus run on all host platforms. In some embodiments, the puck stores a graphic user interface (GUI) which can be retrieved and executed on the host computer. In an embodiment, the GUI is an ADCP GUI which is stored in the ADCP's puck.

Figure 8A:
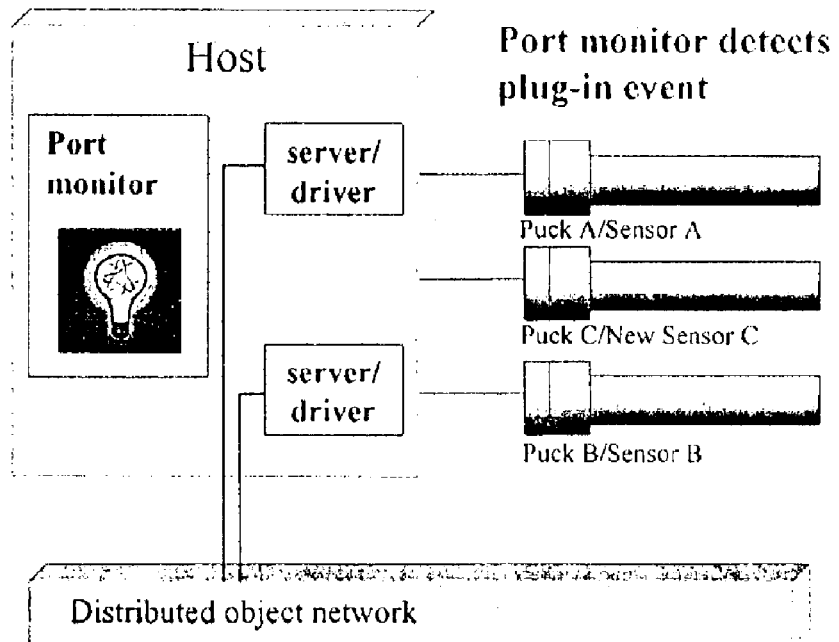
FIGS. 8A–8D illustrates the plug-and-work architecture of the present invention.

FIGS. 8A–8D illustrates the plug-and-work architecture of the present invention. FIG. 8A shows a distributed object network comprising a host, two servers respectively driving a sensor A thru puck A and sensor B thru puck B, respectively. As discussed herein, sensors A, B, C, and so on, can be any serial device, regardless of device software protocols. The host may include cross-platform software such as a generic port monitor. The distributed object network can be any distributed object network such as a MOOS network. Further, the host computer may operate in an Ethernet network environment.

Each puck has, at one end, a standardized connector for coupling with the host's standard serial port, e.g., a 7-pin connector from SEA CON® Brantner & Associates Inc., San Diego, Calif. Each puck has, at the other end, a customizable connector that can be fitted for coupling with a specific sensor. For example, sensor A could be a generic RS-232 instrument, with or without handshaking, while sensor B could be a generic half-duplex RS-485 instrument and sensor C could be a generic half-duplex RS-485 multi-drop instrument.

Figure 8B:
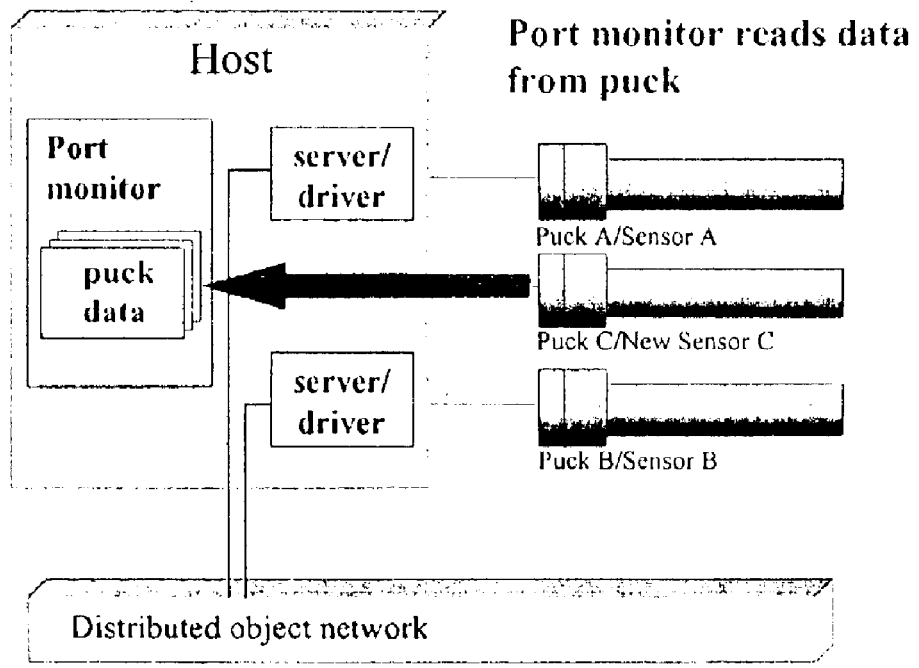
Figure 8C:
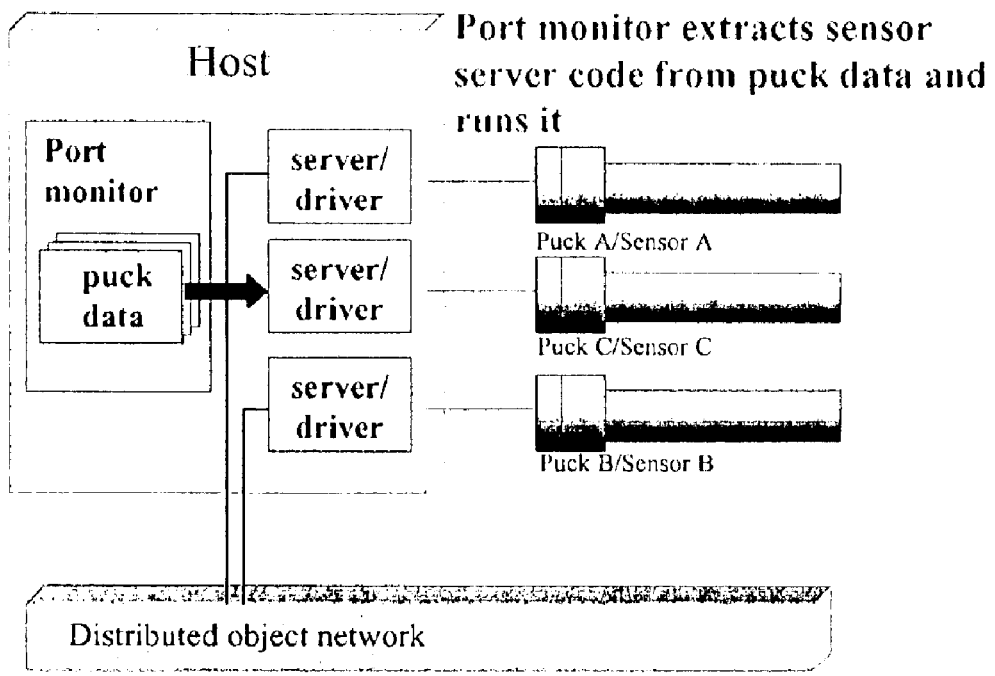
Figure 8D:
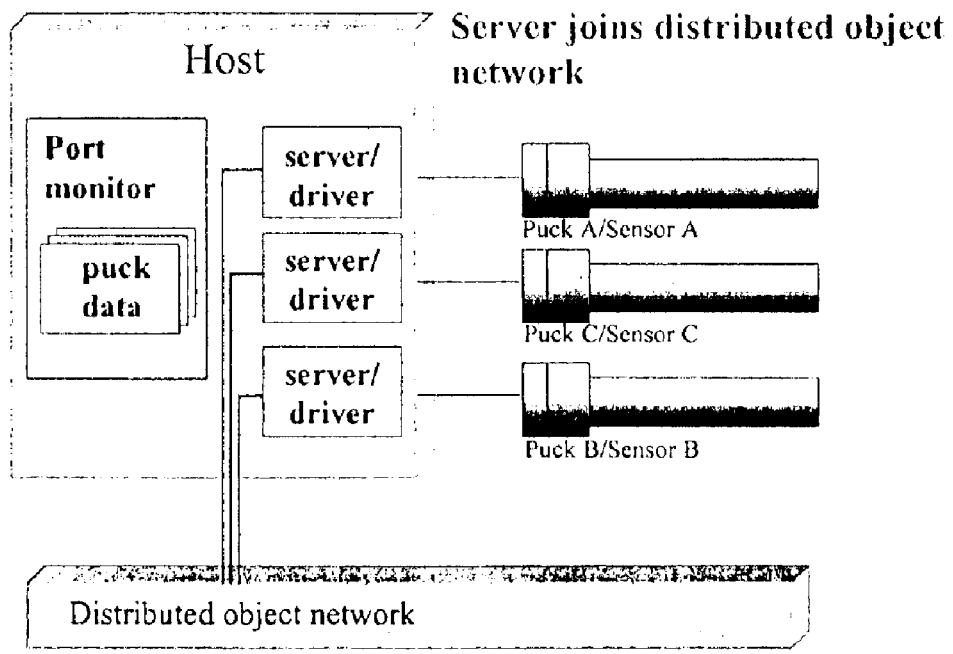

Referring back to FIG. 8A, a new sensor C is plugged into the host via puck C, which is removably attached to the new sensor C. The port monitor detects the plug-in event and reads the sensor information from puck C, as shown in FIG. 8B. Next, the port monitor extracts the server/driver code from the sensor information and executes the code, as shown in FIG. 8C. The sensor C then joins the rest of the existing sensors in the distributed object network as shown in FIG. 8D. As FIGS. 8A–8D demonstrate, the deployment of sensor C in the distributed object network is essentially accomplished by the simple steps of removably attaching puck C to sensor C and plugging puck C to the host computer. The host computer and puck C cooperate to configure sensor C automatically or with minimal user interaction. After introducing sensor C to the host computer, puck C retires into the pass-through mode, i.e., acting as a relay, to allow the host computer to communicate directly with sensor C.

Figure 9:
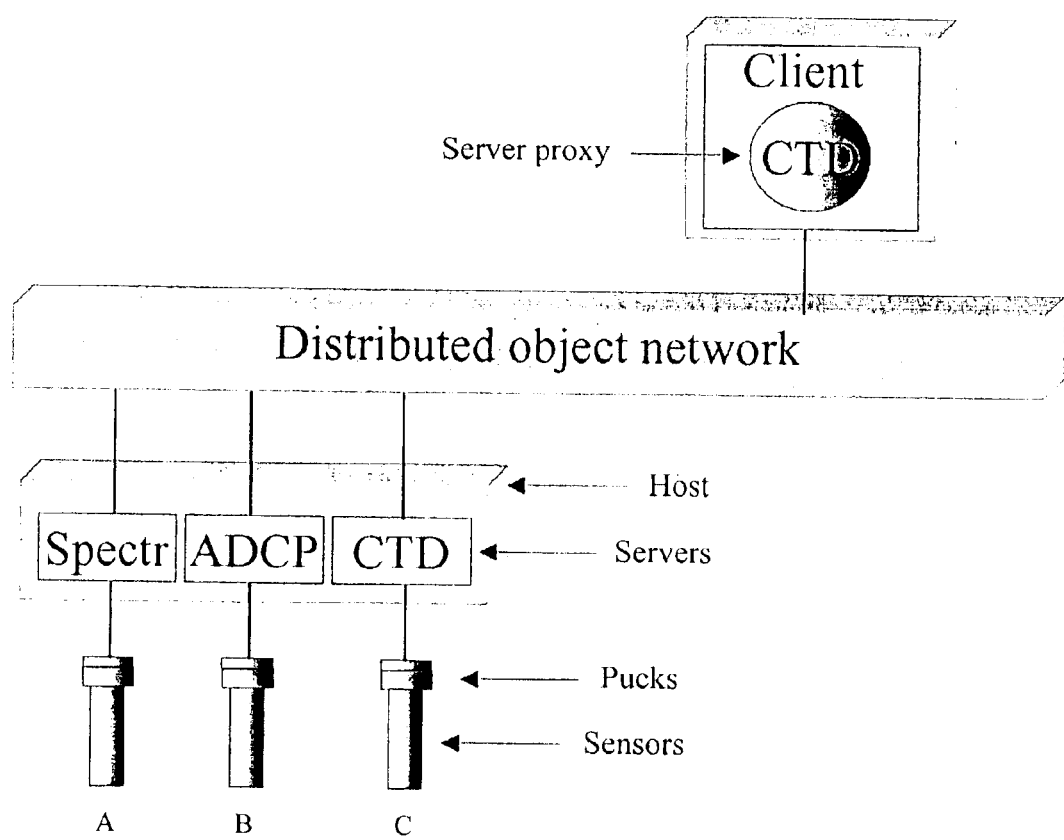
FIG. 9 shows an exemplary distributed object network employing the present invention.

FIG. 9 shows an exemplary distributed object network employing the present invention. In FIG. 9, sensor A is a spectroradiometer, sensor B is an ADCP, and sensor C is a CTD, each having its own puck closely coupled thereto. After deployment, the pucks act as relays and the host operates respective servers and monitors the various instruments coupled thereto. Data collected from the deployed instruments are transmitted over the distributed object network and provided, for example, to a CTD client at a remote site via a server proxy.

Although the present invention and its advantages have been described in detail, it should be understood that the present invention is not limited to or defined by what is shown or discussed herein. In particular, the tables, drawings, description, and discussion disclosed herein illustrate technologies related to the invention, show examples of the invention, and provide examples of using the invention and are not to be construed as limiting the present invention. Known methods, procedures, systems, elements, or components may be discussed without giving details, so to avoid obscuring the principles of the invention. As it will be appreciated by one of ordinary skill in the art, various changes, substitutions, modifications, and alternations can be made and/or implemented without departing from the principles and spirit of the present invention.

Accordingly, the scope of the invention should be determined by the following claims and their legal equivalents.

We claim:

1. A method of introducing a serial device to a host with an interface apparatus, the method comprising the steps of:

attaching the interface apparatus to the serial device;

plugging the interface apparatus into a communication port on the host;

detecting a communication event on the communication port;

putting the interface apparatus in a command mode in response to the communication event;

retrieving the arbitrary information from the interface apparatus, wherein the arbitrary information including a device driver of the serial device;

installing the device driver on the host; and putting the interface apparatus in a pass-through mode.

2. An interface apparatus programmed to implement the method steps of claim 1, said interface apparatus comprising:

a non-volatile memory means for storing arbitrary information about a serial device;

a processing means coupled to the non-volatile memory means fur controlling reading from and writing to the non-volatile memory means;

a first communicating means coupled to the processing means for communicating with a host;

a second communicating means for communicating with the serial device; and a switching means coupled to the processing means, the first communicating means, and the second communicating means for switching modes of the interface apparatus.

3. The interface apparatus according to claim 2, further comprising:

a standardized connecting means for removably attaching the interface apparatus to the host; and a customizable connecting means for removably attaching the interface apparatus to the serial device.

4. The interface apparatus according to claim 3, in which the standardized connecting means is a seven-pin connector conforming to a serial communication protocol.

5. The interface apparatus according to claim 1, which the customizable connecting means is a serial connector conforming to a serial communication protocol.

6. The interface apparatus according to claim 4 or 5, which the serial communication protocol is selected from the group consisting of RS-232 and RS-485.

7. The interface apparatus according to claim 2, in which the serial device is a sensor and the arbitrary information comprises binary data of the sensor.

8. The interface apparatus according to claim 2, in which the serial device is a sensor and the arbitrary information comprises corresponding device driver, unique identifier, calibration data, and history.

9. The interface apparatus according to claim 2, in which the serial device is an instrument for monitoring in open sea.

10. The interface apparatus according to claim 2, in which the serial device is an instrument comprising a plurality of measuring and monitoring devices including at least one sensor and the arbitrary information comprises corresponding device driver, unique identifier, calibration data, and instrument history.

11. The interface apparatus according to claim 2, wherein the serial device is selected from the group consisting of a fluorometer, a radiometer, a spectroradiometer, a seismic sensor, an Acoustic Doppler Current Profiler (ADCP), and a Conductivity-Temperature-Depth (CTD) instrument.

12. The interface apparatus according to claim 2, in which the processing means is a microcontroller and the switching means is a multiplexer.

13. The interface apparatus according to claim 2, in which the host is a computer having at least one serial port connectable to the interface apparatus and an Acoustic Doppler Current Profiler (ADCP) graphic user interface (GUI) retrieved from the interface apparatus.

14. The interface apparatus according to claim 2, in which the modes essentially consisting of a command mode and a pass-through mode.

15. The interface apparatus according to claim 2, in which the modes are controllable by the host via the first communicating means.

16. The method of claim 1, wherein the communication port is a serial port.

17. A distributed network comprising a host, at least one server residing in the host, at least one client communicating with the at least one server, and at least one serial device coupled to the host, the improvement comprising:

removably attaching a puck to a serial device to be deployed in the distributed network; and configuring the serial device for deployment by connecting the removably attached puck to the host, wherein the puck provides a standardized connection between the serial device and the host;

introduces the serial device to the host; and acts as a relay after the introduction; and wherein the puck comprises a memory means for storing information about the serial device;

a processing means coupled to the memory means for controlling reading from and writing to the memory means;

a standardized connecting means allowing communication with the host; and a customizable connecting means allowing communication with the serial device.

18. An interface apparatus for removably connecting a serial device with a host and for configuring the serial device for deployment in a distributed network, the interface apparatus comprises:

a memory means for storing information about the serial device;

a processing means coupled to the memory means for controlling reading from and writing to the memory means;

a standardize connecting means allowing communication with the host; and a customizable connecting means allowing communication with the serial devices;

wherein the interface apparatus has a command mode for allowing the host to retrieve the stored information about the serial device: and a pass-through mode for acting as a relay between the host and the serial device.

19. The improvement according to claim 17, wherein the distributed network is characterized as an oceanic observing network and the serial device is an instrument for monitoring in open sea.

20. The interface apparatus according to claim 18, wherein the distributed network is characterized as an oceanic observing network and the serial device is an instrument for monitoring in open sea.

* * * * *